(12) United States Patent
Finkelstein

(10) Patent No.: US 11,075,472 B2
(45) Date of Patent: Jul. 27, 2021

(54) SYSTEMS AND METHODS FOR ACTIVE TAPS IN CABLE NETWORKS

(71) Applicant: Cox Communications, Inc., Atlanta, GA (US)

(72) Inventor: Jeffrey L. Finkelstein, Atlanta, GA (US)

(73) Assignee: Cox Communications, LLC, Atlanta, GA (US)

( * ) Notice: Subject to any disclaimer, the term of this patent is extended or adjusted under 35 U.S.C. 154(b) by 0 days.

(21) Appl. No.: 16/268,322

(22) Filed: Feb. 5, 2019

(65) Prior Publication Data

US 2020/0251835 A1 Aug. 6, 2020

(51) Int. Cl.
*H04B 17/318* (2015.01)
*H01R 9/05* (2006.01)

(52) U.S. Cl.
CPC ......... *H01R 9/0509* (2013.01); *H04B 17/318* (2015.01)

(58) Field of Classification Search
CPC .............. H04B 7/15535; H04B 17/318; H04B 10/2503; H04B 10/80; H04B 10/807; H04B 1/0458; H04B 1/44; H04B 2001/0416; H04B 3/36; H04B 3/44
USPC ................. 375/211, 219–22, 256, 259, 345
See application file for complete search history.

(56) References Cited

U.S. PATENT DOCUMENTS

| | | | | |
|---|---|---|---|---|
| 5,949,301 A * | 9/1999 | Clarke, Jr. | ............. | H04N 7/102 333/101 |
| 6,362,685 B1 * | 3/2002 | Vagher | ..................... | H03F 3/602 330/124 R |
| 8,009,989 B1 * | 8/2011 | Gerszberg | ........ | H04B 10/25752 398/115 |
| 8,515,339 B2 * | 8/2013 | Yona | .................... | H04W 88/085 455/115.1 |
| 9,917,640 B2 * | 3/2018 | Grobe | ................. | H04J 14/0227 |
| 10,142,677 B2 * | 11/2018 | Wells | ..................... | H04N 7/104 |
| 10,630,374 B2 * | 4/2020 | Ashworth | .......... | H04B 7/15535 |
| 2007/0008939 A1 * | 1/2007 | Fischer | ............... | H04W 88/085 370/338 |
| 2013/0133019 A1 * | 5/2013 | Montena | ................ | H04N 21/61 725/127 |
| 2013/0148207 A1 * | 6/2013 | Michaloski | .......... | G02B 27/144 359/629 |
| 2015/0011157 A1 * | 1/2015 | Terry | ................. | H04B 7/15535 455/10 |

(Continued)

*Primary Examiner* — Emmanuel Bayard
(74) *Attorney, Agent, or Firm* — Eversheds Sutherland (US) LLP

(57) ABSTRACT

In various embodiment, the disclosed systems, methods and apparatuses are directed to active taps. In particular, the disclosure is directed to providing an input port of a device to receive a first radio frequency (RF) signal; providing a plurality of output ports of the device to transmit second RF signals based on the first RF signal; coupling a bidirectional amplifier to the input port and at least a portion of the plurality of output ports; and modifying, using the bidirectional amplifier, the magnitude of at least the first RF signal. Further, a controller may be coupled to the cable modem; further the controller may be used to control the bidirectional amplifier or operate, based on instructions received from the cable modem, relays associated with the plurality of output ports of the active tap.

20 Claims, 7 Drawing Sheets

(56) References Cited

U.S. PATENT DOCUMENTS

| | | | | |
|---|---|---|---|---|
| 2015/0207525 A1* | 7/2015 | Li | .................... | H04N 7/17309 |
| | | | | 370/297 |
| 2016/0272201 A1* | 9/2016 | Kang | ..................... | G05D 1/00 |
| 2017/0104522 A1* | 4/2017 | Zinevich | ............ | H04B 10/0771 |
| 2018/0294866 A1* | 10/2018 | Ashworth | .......... | H04B 7/15535 |
| 2019/0327625 A1* | 10/2019 | Patel | .................... | H04W 24/08 |
| 2019/0342765 A1* | 11/2019 | Pataky | ................ | B61L 15/0027 |
| 2020/0044618 A1* | 2/2020 | Terry | ........................ | H03F 3/68 |

\* cited by examiner

SYSTEMS AND METHODS FOR ACTIVE TAPS IN CABLE NETWORKS

BACKGROUND

A variety of service providers, such as cable providers and satellite providers, may connect user devices to one or more networks, such as cable networks and/or the Internet. A provider may provide cable and/or Internet access to a residence via devices such as headends which may include a computer system and/or database required for provisioning of content. The headend may include cable modem termination system (CMTS), which can send and receives cable modem signals on a cable network to provide Internet services to cable subscribers. However, the residence may experience issues such as congestion, speed losses, pricing spikes, service interruptions, and the like that can degrade the user experience. Accordingly, there is a strong need in the market for systems and methods that remedy such problems and challenges.

BRIEF DESCRIPTION OF THE DRAWINGS

Figure 1:
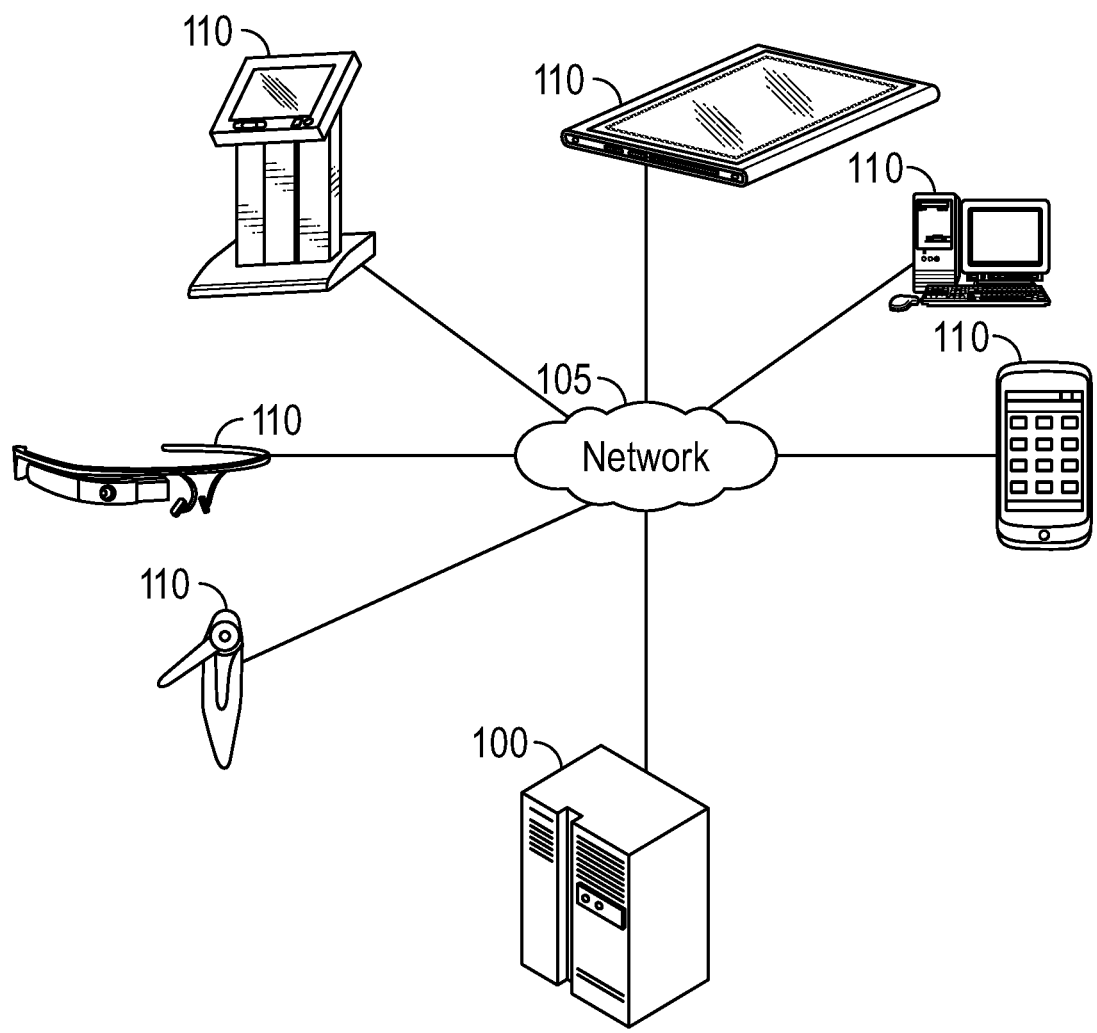
Figure 2:
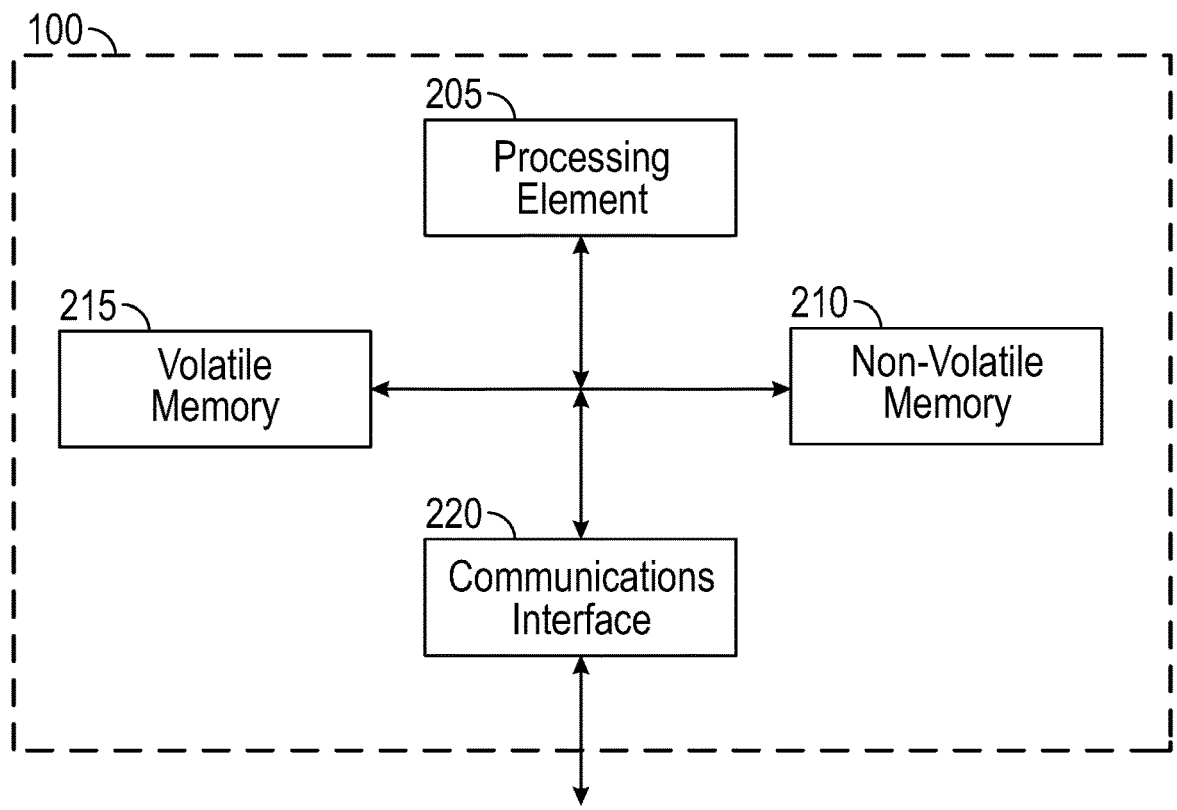
Figure 3:
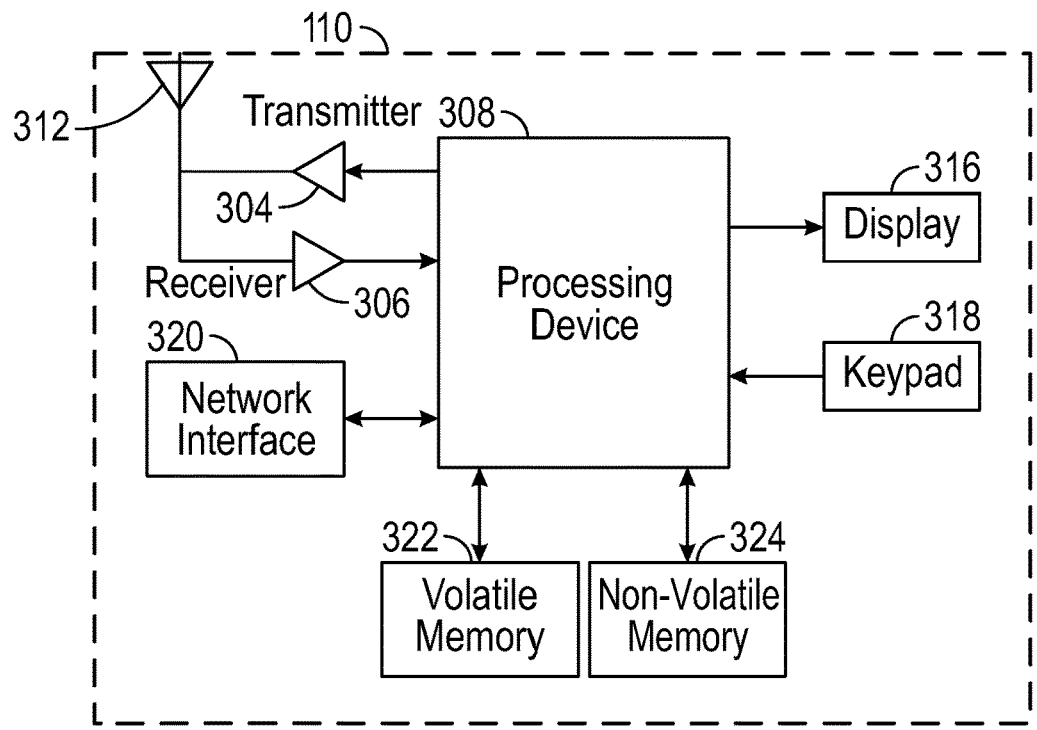
Figure 4A:
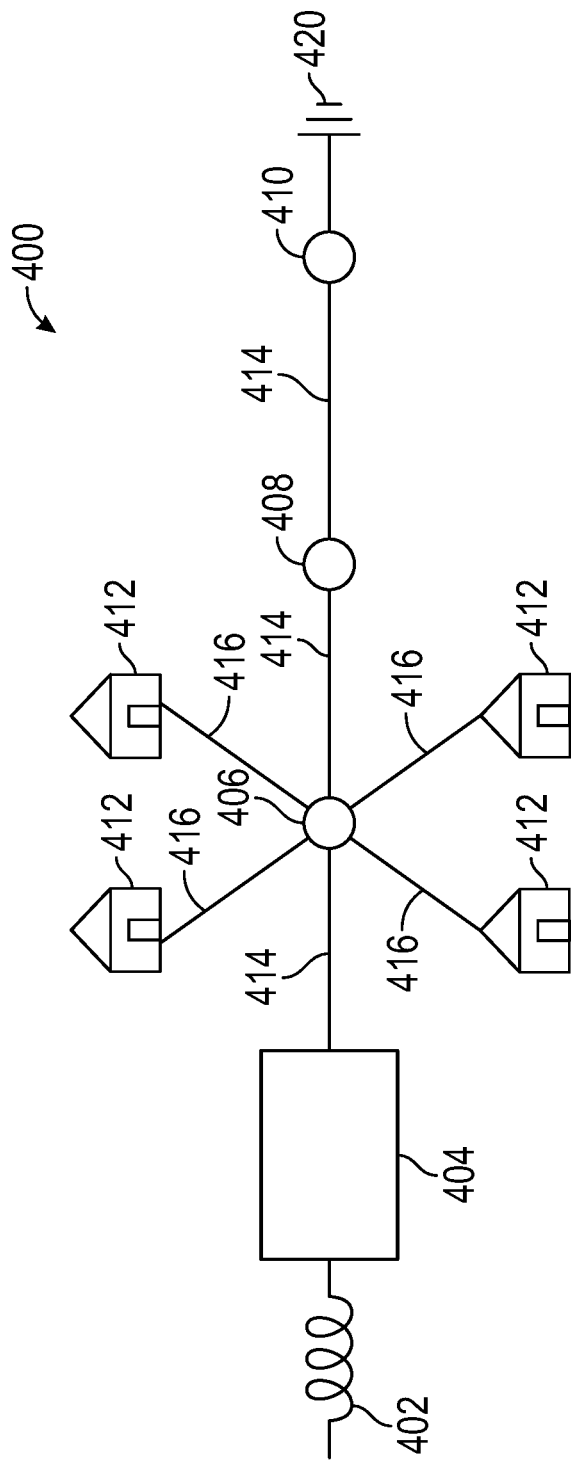
Figure 4B:
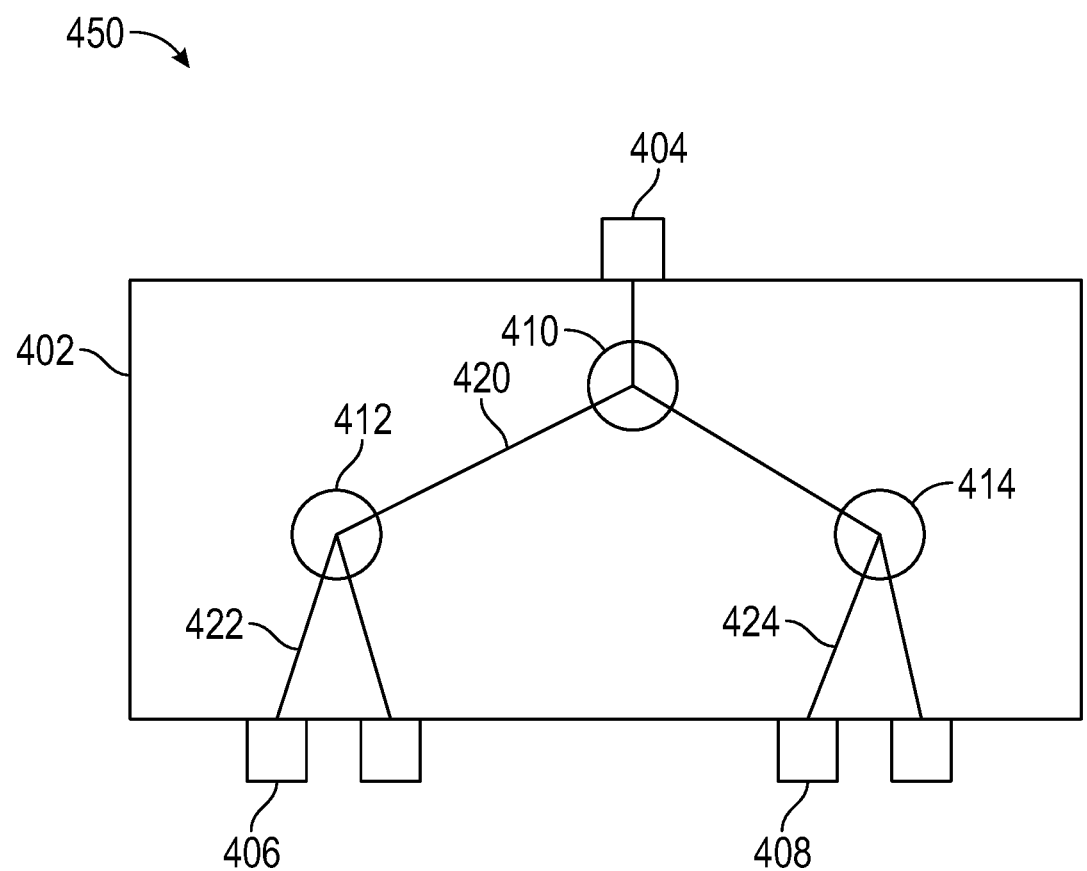
Figure 5:
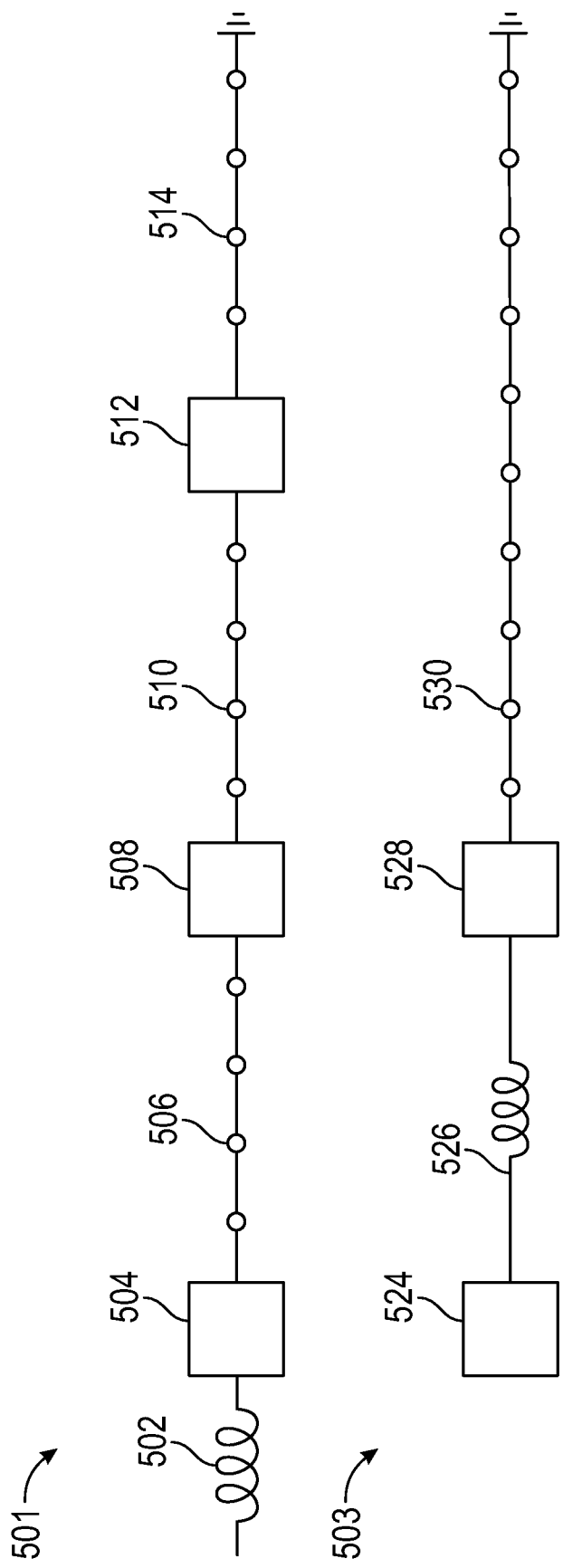

Having thus described the disclosure in general terms, reference will now be made to the accompanying drawings, which may not necessarily be drawn to scale, and wherein:

FIG. 1 is an overview of a system that can be used to practice example embodiments of the present disclosure;

FIG. 2 is an example schematic diagram of a management computing entity, in accordance with example embodiments of the disclosure;

FIG. 3 is an example schematic diagram of a user device, in accordance with example embodiments of the disclosure;

FIG. 4A shows an example schematic diagram of a portion of a cable network and associated devices, in accordance with example embodiments of the disclosure;

FIG. 4B shows an example schematic diagram of a tap, in accordance with example embodiments of the disclosure;

FIG. 5 shows an example schematic diagrams of portions of networks using taps, in accordance with example embodiments of the disclosure.

Figure 6:
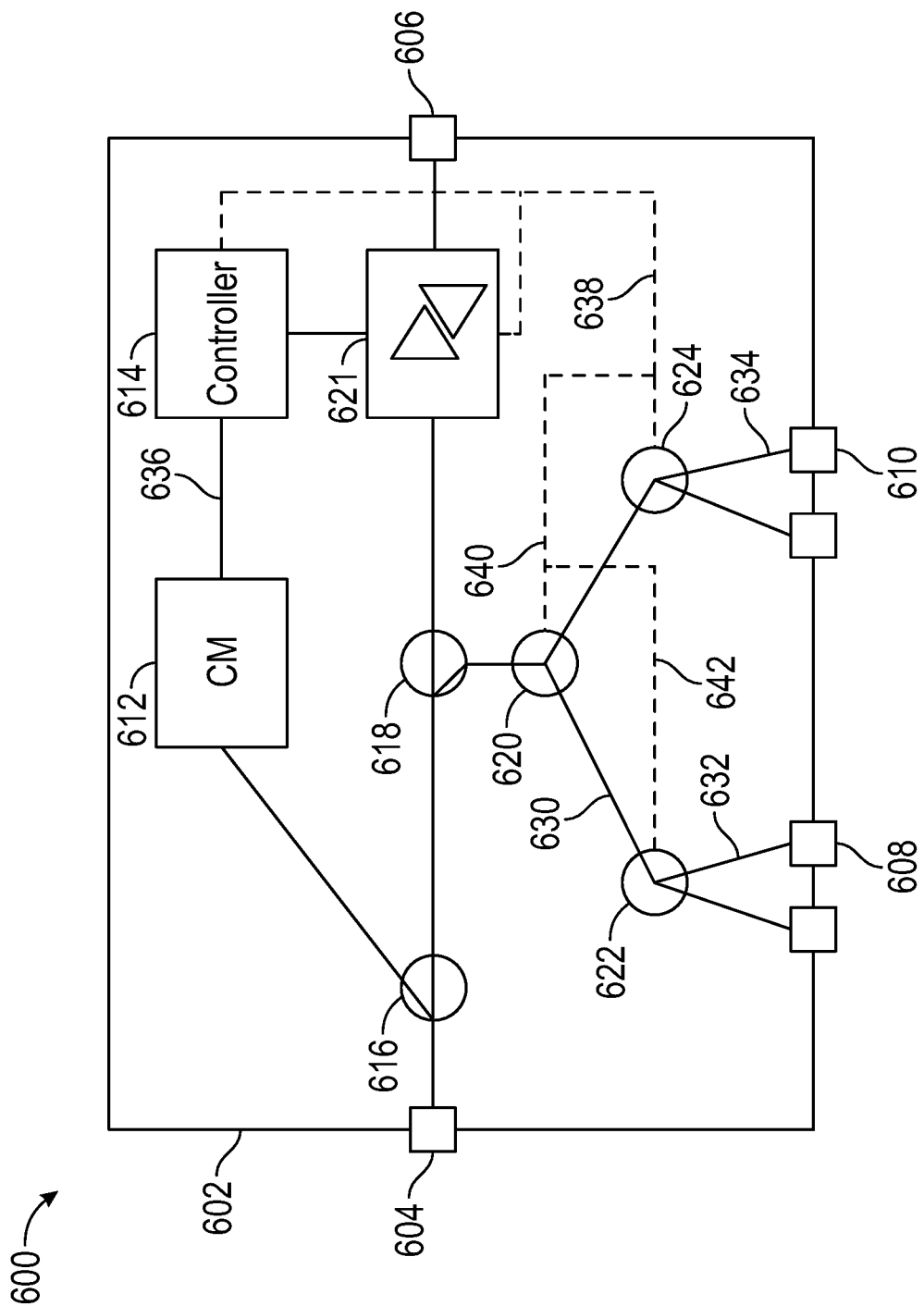
Figure 7:
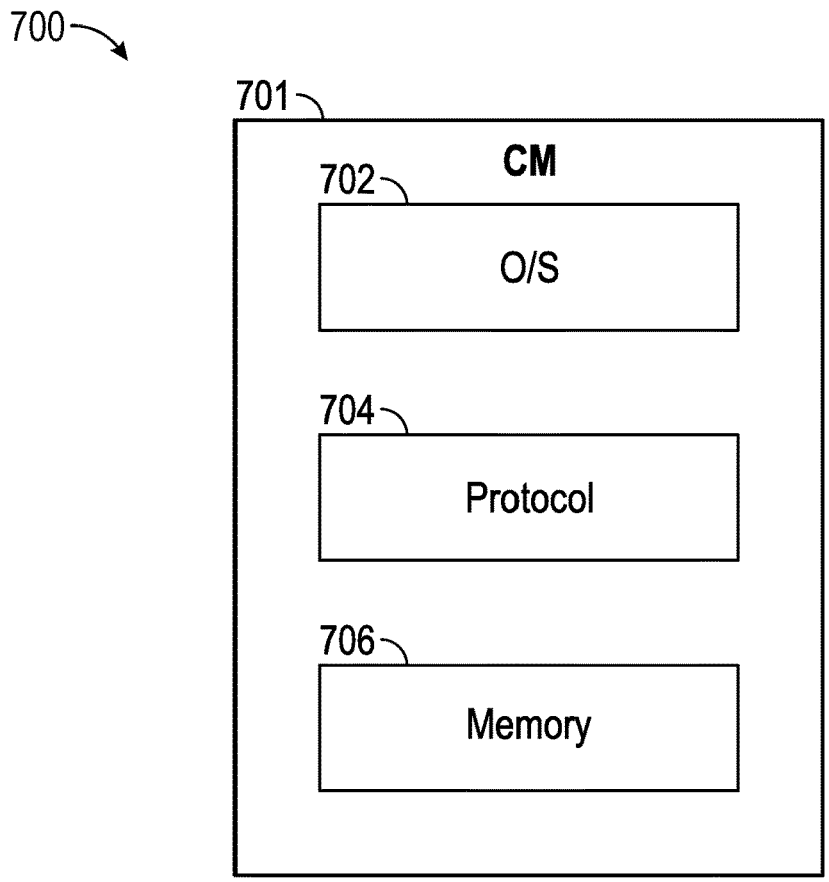
Figure 8:
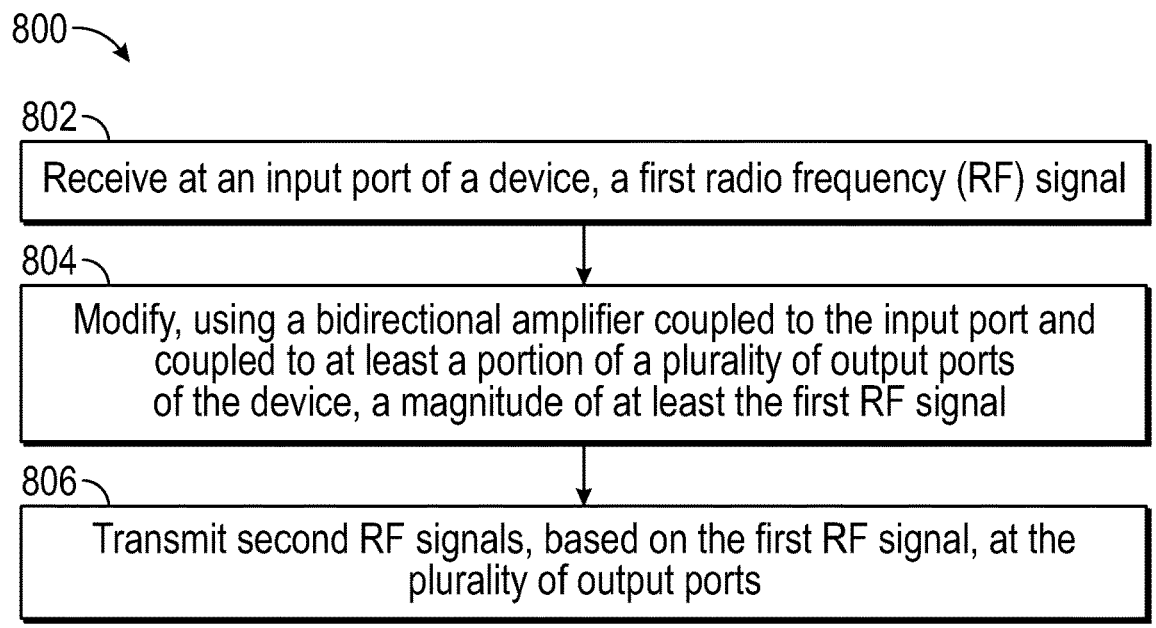

FIG. 6 shows an example schematic diagram of an active tap, in accordance with example embodiments of the disclosure;

FIG. 7 shows a schematic diagram of a cable modem, in accordance with example embodiments of the disclosure; and FIG. 8 shows a flow chart illustrating example operations that may be performed by one or more devices described in connection with the disclosed system, in accordance with various embodiments of the disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF VARIOUS EMBODIMENTS

In various embodiments, described herein include systems, methods, and apparatuses for active taps for use in connection with a network (e.g., a wired network such as a cable network). In particular, embodiments of the disclosure describe an input port for receiving a first radio frequency (RF) signal; a plurality of output ports for transmitting second RF signals based on the first RF signal; and a bidirectional amplifier electrically coupled to the input port and at least a portion of the plurality of output ports, where the bidirectional amplifier is configured to modify the magnitude of at least the first RF signal.

Other embodiments of this aspect include corresponding systems, apparatus, and computer programs, configured to perform the actions of the methods, encoded on computer storage devices.

Particular embodiments of the subject matter described herein can be implemented so as to realize one or more of the following advantages. Improve network stability and operational data transfer rates and, in turn, improve the user experience. Reduce the costs associated with routing network traffic, network maintenance, network upgrades, and/or the like.

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 1 provides an illustration of an example embodiment of the present disclosure. As shown in FIG. 1, this particular embodiment may include one or more management computing entities 100, one or more networks 105, and one or more user devices 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

In various aspects, the management computing entities 100 may include various devices or portions of devices on a cable network, including, but not limited to, cable modems, optical nodes, taps, active taps, switches, medium access control (MAC) devices, physical layer (PHY) devices, amplifiers, fiber nodes, access points (APs), and the like, variously described below. In another embodiment, such devices may include circuitry (e.g., processors and memory) and associated software instructions (e.g., computer code) to perform various functions associated with such devices (e.g., determine signals for transmission, modulate signals in accordance with one or more modulation techniques, transmit signals including packets, receive including packets, process including packets, schedule including packets, etc.). Moreover, such management computing entities 100 may perform aspects of the transmission of data over networks in accordance with various techniques as described herein (e.g., at least with respect to FIGS. 4-8, below).

In another embodiment, the networks 105 may include, but not be limited to, cable networks including hybrid fiber-coaxial networks. More broadly, the networks 105 may include at least portions of wireless networks or wired networks. In another embodiment, a cable network may use various sub-networks (e.g., WiFi networks, cellular networks) to perform aspects of the functionality described herein, for example, in connection with the disclosed devices (e.g., switches, taps, active taps, MAC devices, cable modem termination system (CMTS) devices, PHY devices, amplifiers, optical fiber nodes, access points, and the like). In another embodiment, the networks 105 may use at least a portion of a fifth-generation cellular mobile communications, also referred to as 5G herein.

In another embodiment, the user devices 110 may include, but not be limited to, devices associated with a customer premise equipment (e.g., devices located in the home of a user or on the person of a user). Non-limiting examples may include, but not be limited to, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

FIG. 2 provides a schematic of a management computing entity 100 according to one embodiment of the present disclosure. As noted above, a management computing entity 100 may include various devices on a cable network, including, but not limited to, switches, MAC devices, access point devices, taps, active taps, PHY devices, amplifiers, fiber nodes, and the like.

Further, the management computing entity 100 may include a content component, a processing component, and a transmitting component (not shown). In particular, the content component may serve to determine signals indicative of data (e.g., video, audio, text, data, combinations thereof, and/or the like) to be transmitted over the network. In another embodiment, the determination of the signal for transmission may be, for example, based on a user input to the device, a predetermined schedule of data transmissions on the network, changes in network conditions, and the like. In one embodiment, the signal may include that data may be encapsulated in a data frame that is configured to be sent from a device to one or more devices on the network.

In another embodiment, the processing component may serve to determine various parameters associated with the signal for transmission over the network. For example, the processing component may serve to determine various parameters for the signal a modulation scheme, a power level (a particular power level and/or code scheme), a frequency band of communication, header information associated with the signal, combinations thereof, and/or the like.

In one embodiment, the transmitting component (not shown) may serve to transmit the signal from one device to another device on the network. For example, the transmitting component may serve to prepare a transmitter (e.g., transmitter 304 of FIG. 3, below) to transmit the signal over the network. For example, the transmitting component may queue the signal in one or more buffers, may ascertain that the transmitting device and associated transmitters are functional and have adequate power to transmit the signal over the network, may adjust one or more parameters (e.g., modulation type, signal amplification, signal power level, noise rejection, combinations thereof, and/or the like) associated with the transmission of the signal.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Zigbee, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the management computing entity 100. In some embodiments, user devices 110 may include, but not be limited to, devices associated with a customer premise equipment, as described above. In another embodiment, the user device 110 may be configured to receive data from an access point, or other similar device (e.g., at a customer premise equipment site such as a home).

In various aspects, the processing component, the transmitting component, and/or the receiving component (not shown) may be configured to operate on one or more devices (e.g., device 404 to be shown and described in connection with FIG. 4, below, which may include a CMTS, another network controller device further upstream on the network, and/or other devices further downstream on the network) may include aspects of the functionality of the management computing entity 100, as shown and described in connection with FIGS. 1-2 here. In particular, the processing component, the transmitting component, and/or the receiving component may be configured to be in communication with one or more processing elements 205, memory 210, volatile memory 215, and may include a communication interface 220 (e.g., to facilitate communication between devices, for example, with various customer premise equipment such as cable modems).

FIG. 3 provides an illustrative schematic representative of a user device 110 that can be used in conjunction with embodiments of the present disclosure. For example, the user device 110 may be used in connection with the active taps described below. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example, Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (for example, radio), a receiver 306 (for example, radio), and a processing element 308 (for example CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the management computing entity 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the management computing entity 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (for example including executable instructions, applications, program modules), and operating system.

According to one embodiment, the user device 110 may include location determining aspects, devices, modules, functionalities, and/or similar words used herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the management computing entity 100, as described herein. The user input interface can comprise any of a number of devices or interfaces allowing the user device 110 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the user device 110 may include one or more components or functionality that are the same or similar to those of the management computing entity 100, as described in greater detail above. As will be recognized, these architectures and descriptions are provided for example purposes only and are not limiting to the various embodiments.

In various embodiments, some HFC networks (e.g., legacy HFC networks) may include taps with separate associated amplifiers. Described herein are systems, methods, and apparatuses for active taps, where the active taps may include at least one bidirectional amplifier within the housing of the active tap. In another embodiment, the bidirectional amplifier may be configured on the pass-through leg of the active tap (see for example, diagram 600 of FIG. 6 and related description, below). In some embodiments, the bidirectional amplifier may be configured to use a pushpin attenuator, a potentiometer, and/or the like. In another embodiment, the bidirectional amplifier may be configured to have a predetermined attenuation (e.g., approximately 5 dB, 10 dB, etc.).

In another embodiment, the active tap may include, in addition to the bidirectional amplifier, a cable modem and a controller within the housing of the active tap. In some embodiments, a cable modem may be used serve to detect signals on the inputs of the active tap and may be configured to work with controller to turn on and off various splitters of the active tap. In some embodiments, the cable modem and/or controller may further be configured to add tilt, clean noise, perform signal processing, and/or the like on the signals passing through the active tap.

In various embodiments, the active tap may have any suitable number of ports including, but not limited to, two, four, eight, twelve, sixteen, twenty, twenty-four, twenty-eight, thirty-two, thirty-six, forty, forty-four, forty-eight, fifty-two, sixty-four, etc.). The more taps in a network, the more passive losses, and therefore, the greater degree of amplification needed (e.g., via a bidirectional amplifier). For example, for eight ports, there may be about 11 dB of losses; for sixteen ports, there may be about 14 dB of losses; for twenty-four ports, there may be about 17 dB of losses, etc. In some embodiments, once the losses exceed about 33 dB, it may be more difficult to amplify the original signal inputted to an amplifier on the network. In some embodiments, the active taps may operate on any suitable frequency range, including up to about 3 gigahertz (GHz).

In some embodiments, for passive taps on legacy HFCs, there may be about 17 active devices (e.g. amplifiers) for about 500 homes passed. Each active device may consume about 120 W of power (e.g., corresponding to about 57 dB to 74 dB of gain depending on frequency). Accordingly, for 17 active devices, the total number of actives may be about 17 multiplied by 120 W, which may represent about 2 kW of power consumed.

In various aspects, using various embodiments of the disclosure, the total number of taps that may be needed may be reduced (as discussed, for example, in connection with FIG. 5 diagram 503, below). In particular, for a similar coverage area of a portion of the network as in the example above, there may need to be about five active taps for every active device of a legacy network. Accordingly, there may be about 85 active taps (e.g., five multiplied by seventeen active devices). Each of the active taps may consume much less power (e.g., about 5 W, corresponding to about 12 to about 15 dB of gain depending on frequency). Therefore, the total power usage of the 85 active taps may be about 425 W (as compared with the about 2 kW of power consumed by the active devices of a legacy HFC network of a similar coverage). Accordingly, a network of active taps may consume relatively lower amounts of power as compared with legacy networks having separate taps and amplifiers. Further, such taps may be positioned about 100 feet apart as opposed to about 1000 feet apart in the case of passive taps on legacy HFC networks.

FIG. 4A shows an example diagram 400 of a portion of a cable network and associated devices in a particular network deployment, in accordance with example embodiments of the disclosure. In various embodiments, the scheduler described herein may be used in connection with the network and associated devices depicted in diagram 400, as described further below. In some aspects, the cable network described herein can be implemented using a data over cable service interface specification (DOCSIS) specification.

In an embodiment, there can be a device 404, which may implement aspects of the scheduling functionality described herein. The device 404 can include a cable modem termination system (CMTS), which can also be referred to as an access controller, a controller, and/or a node herein. In an embodiment, the device can have a converged cable access platform (CCAP) functionality. In another embodiment, the device 404 can serve as remote physical (PHY) device, that is, a device having PHY layer functionality (that is, PHY layer functionality as described in connection with the open systems interconnection model, OSI model).

In an embodiment, there can be a fiber 414 connected to the device 404 and another fiber 402 that connects the device 404 to the upstream network (not shown); the device 404 can further be connected to various network cable taps 406, 408, and 410, also referred to as taps or terminations herein, and can connect to various cable modem (CM) devices, for example, at various households 412.

In some embodiments, a cable network can include a fiber optic network, which can extend from the cable operators' headend out to a neighborhood's hubsite, and finally to a coaxial cable node which serves customers, for example, 25 to 2000 households.

In an embodiment, data can be transmitted downstream from the device 404 to one or more devices (which may implement aspects of the scheduling functionality described herein) at homes 412 over drop cables (also referred to as drops herein) 416 using one or more taps 406, 408, and 410, and having a common ground 420. In an embodiment, as the data is transmitted downstream from the device 404 to one or more homes 412, the taps 412 can potentially generate various impairments on the network. Alternatively or additionally, as the signals pass through from the device 404 to the taps 406, 408, and 410 over fibers 414 and to the homes 412 over one or more drops 416, the fibers 414 and/or the drops 416 can cause the signals to undergo various impairments, for example, to the power spectral density of the signals. In an embodiment, the impairment can be due to attenuation on the fibers 414 and/or drops 416. In an embodiment, the impairments can lead to frequency distortions on the signals; for example, the higher frequency end of the signals may be attenuated. Accordingly, in an embodiment, one or more amplifiers (not shown) can be used to perform a gain on the attenuated signals. In an embodiment, the one or more amplifiers can be placed, for example, at one or more of the taps 406, 408, and 410 to perform the gain on the attenuated signals.

In some aspects, the cable network as described above can include a regional or area headend/hub. The hub can receive programming that is encoded, modulated and upconverted onto radio frequency (RF) carriers, combined onto a single electrical signal and inserted into a broadband transmitter, for example, an optical transmitter. In some embodiments, the transmitter can convert the electrical signal to a downstream modulated signal that is sent to the nodes. Fiber optic cables connect the headend or hub to nodes in various topologies, including, but not limited to, point-to-point or star topologies, ring topologies, and the like.

By using frequency-division multiplexing, an HFC network such as the one described in connection with FIG. 4A may carry a variety of services, for example, analog and digital TV, video on demand, telephony, data, and the like. Services on these systems can be carried on radio frequency (RF) signals in particular regions of the available spectrum.

The HFC network can be operated bi-directionally such that signals are carried in both directions on the same network. For example, the signals can be transmitted from the headend/hub office to the customer, and from the customer to the headend/hub office. In one aspect, a forward-path or downstream signals can refer to information from the headend/hub office to the customer. In another aspect, a return-path or upstream signals can refer to information from the customer to the headend/hub office. The forward-path and the return-path can be carried over the same coaxial cable in both directions between the node and the customer equipment.

In various aspects, the device 404 (e.g., CMTS device) and/or the network cable taps 406, 408, and 410 may include aspects of the functionality of the management computing entity 100, as shown and described in connection with FIGS. 1-2, above. Further, the taps 406, 408, and 410 may include active taps, as described variously herein. In particular, the device 404 (e.g., CMTS device) and/or the network cable taps 406, 408, and 410 may include or be in communication with one or more processing elements 205, memory 210, volatile memory 215, and may include a communication interface 220 (e.g., to communicate with between each other and with various customer premise equipment such as cable modems).

Moreover, the homes 412 may include customer premise equipment may include devices that include aspects of the functionality of the user device 110, as further shown and described in connection with FIG. 3, above. For example, customer premise equipment at the homes 412 may include devices having a transmitter 308, a receiver 304, and/or a network interface (e.g., to communicate with an access point or other device to receive information from the fiber node 410 or similar device). Moreover, the devices at the customer premise equipment may include volatile memory 322 and/or non-volatile memory 324 in addition to a processor (e.g., to perform one or more computational tasks, such as processing received signals, etc.). Further, the customer premise equipment may include a display 316 and/or a keypad 318 (e.g., for interacting with a user or operator).

In an embodiment, a given transmitting device on the network can transmit a pre-determined sequence, for example, a 32-symbol (or any suitable number of symbol) sequence where each symbol includes a pre-determined amount of data, to the receiving devices. Accordingly, when the receiving devices receive the pre-determined sequence, the receiving devices may be programmed to be able to determine one or more characteristics that the signal associated with the received pre-determined sequence should have. Therefore, the receiving device can determine whether there is a deviation from what the receiving device would have received absent distortions in the received signal.

In an embodiment, the receiving devices can take various measurements, for example, measurements to characterize one or more channels associated with signals received by the receiving device, and/or one or more measurements associated with the received signal from the transmitting device, including, but not limited to, signal-to-noise ratio (SNR) measurements, minimum end-of-line (MER) measurements, slopes measurements, amplitude measurements, ripple measurements, spike (for example, non-linear noise distortions) measurements, absolute received power per subcarrier measurements, error vector magnitude measurements, and the like. The receiving device can then transmit at least portions of the measurements in informational blocks, for example, as data packets, back to the transmitting device. The transmitting device can modify a table based on the received information from the receiving device, for example, a table stored in internal memory. In an embodiment, the table can include information such as what sequence the receiving device would have received absent any distortions to the signal, what sequence the receiving device actually received, what sequence the transmitting device received back from the receiving device (which may also be subject to further distortions), and/or any information indicative of the measurements taken by the receiving device of the channel and/or the received signal, as described above. In some embodiments, the CMTS or controller can determine interference groups (IGs) based on the received information from the receiving devices.

In various embodiments, the network and various devices on the network (e.g., the CMTS, controllers, receiving devices, active taps, combinations thereof, and/or the like), may determine the appropriate power levels for transmitting various signals on the network in accordance with a NOMA technique (e.g., a power-multiplexing NOMA technique) based on the various measurements described above, and/or based at least in part on the received pre-determined sequences. In additional or alternative embodiments, the network and various devices on the network may determine the appropriate code words and schemes for transmitting various signals on the network in accordance with a NOMA technique (e.g., a CDMS-based NOMA technique) based on the various measurements described above, and/or based at least in part on the received pre-determined sequences. For example, the power levels for transmitting various signals over the network in accordance with power-multiplexing NOMA technique may determine to transmit a first signal at a higher power for a receiving device that is communicating on a weaker channel, which may be determined by numerous factors, individually or in combination, such as one or more measurements indicative of the efficacy of receiving the pre-determined sequences by the receiving device, SNR measurements, MER measurements, slopes measurements, amplitude measurements, ripple measurements, non-linear noise distortion measurements, absolute received power per subcarrier measurements, error vector magnitude measurements, and/or the like.

In some embodiments, the cable network as described above can include a regional or area headend/hub. The hub can receive programming that is encoded, modulated and upconverted onto radio frequency (RF) carriers, combined onto a single electrical signal and inserted into a broadband transmitter, for example, an optical transmitter. In some embodiments, the transmitter can convert the electrical signal to a downstream modulated signal that is sent to the nodes. Fiber optic cables connect the headend or hub to nodes in various topologies, including, but not limited to, point-to-point or star topologies, ring topologies, and the like.

By using frequency-division multiplexing and/or the NOMA-based techniques described herein, an HFC network such as the one described in connection with FIG. 4A may carry a variety of services, for example, analog and digital TV, video on demand, telephony, data, and the like. Services on these systems can be carried on radio frequency (RF) signals in particular regions of the available spectrum.

In one embodiment, the HFC network can be operated bi-directionally such that signals are carried in both directions on the same network. For example, the signals can be transmitted from the headend/hub office to the customer, and from the customer to the headend/hub office. In one aspect, a forward-path or downstream signals can refer to information from the headend/hub office to the customer. In another embodiment, a return-path or upstream signals can refer to information from the customer to the headend/hub office. The forward-path and the return-path can be carried over the same coaxial cable in both directions between the node and the customer equipment. In some embodiments, HFC network can be structured to be asymmetrical, that is, data transmission in the downstream direction has much more data-carrying capacity than the upstream direction.

In various aspects, the device 404 (e.g., CMTS device) and/or the network cable taps 406, 408, and 410 may include aspects of the functionality of the management computing entity 100, as shown and described in connection with FIGS. 1-2, above. In particular, the device 404 (e.g., CMTS device) and/or the network cable taps 406, 408, and 410 may include or be in communication with one or more processing elements 205, memory 210, volatile memory 215, and may include a communication interface 220 (e.g., to communicate with between each other and with various customer premise equipment such as cable modems).

Moreover, the homes 412 may include customer premise equipment may include devices that include aspects of the functionality of the user device 110, as further shown and described in connection with FIG. 3, above. For example, customer premise equipment at the homes 412 may include devices having a transmitter 308, a receiver 304, and/or a network interface (e.g., to communicate with an access point or other device to receive information from the fiber node 410 or similar device). Moreover, the devices at the customer premise equipment may include volatile memory 322 and/or non-volatile memory 324 in addition to a processor (e.g., to perform one or more computational tasks, such as processing received signals, etc.). Further, the customer premise equipment may include a display 316 and/or a keypad 318 (e.g., for interacting with a user or operator). As noted, the customer premise equipment including user devices (e.g., such as user device 110) may be configured to transmit and receive signals in accordance with a NOMA technique, as described variously herein.

FIG. 4B shows an example schematic diagram of a tap, in accordance with example embodiments of the disclosure. In particular, diagram 400 represents a tap, where the tap may be used in the context of portion of the cable network shown above in connection with FIG. 4A. In some embodiments, the tap of diagram 400 may not include any amplifiers in the housing 402 of the tap. In another embodiment, diagram 400 may represent a tap that may correspond to any of the taps shown and described in connection with elements 506, 510, and/or 514 of FIG. 5, below.

In some embodiments, diagram 400 shows a housing 402 of a tap. In one embodiment, the housing 402 may be made of any suitable material. In another embodiment, the housing 402 may be made of metal and/or plastic. Suitable metals may include, but not be limited to, aluminum, copper, silver, steel, brass, combinations thereof, and/or the like. Suitable plastics may include, but not be limited to, polyethylene terephthalate (PETE or PET), high-density polyethylene (HDPE), polyvinyl chloride (PVC), low-density polyethylene (LDPE), polypropylene (PP), combinations thereof, and/or the like. In another embodiment, the housing 402 may have any suitable dimensions. In one embodiment, the housing 402 may be rugged for environmental protection. In some embodiments, the housing 402 may be shielded from electromagnetic interference (EMI), for example, using a Faraday cage.

In an embodiment, diagram 400 shows an input 404 to the tap. In some embodiments, the input 404 to the tap may be from a cable and/or a plant side. In an embodiment, the input 404 to the tap may feed in from a remote device (e.g., remote PHY device, remote medium access control (MAC) device, and/or the like). In another embodiment, the input 404 to the tap may include a signal that is inputted to a coaxial input and having RF energy. In some embodiments, the input 404 to the tap may be provided using any suitable connector.

As noted, the remote devices may include remote MAC and/or remote PHY devices. In particular, the remote MAC devices, in combination with a switch at a headend device and (optionally) in combination with remote PHY devices, may perform aspects of a control plane functionality, a management plane functionality, and/or a data plane functionality. In an embodiment, the management plane functionality associated with a networking device can refer to configuring, monitoring, and providing management, monitoring and configuration services to, various devices operating at various layers of the network stack and other parts of the network. In an embodiment, the management plan functionality can be distinguished from the control plane functionality, in that the control plane functionality can be directed to implementing routing table and forwarding information activities. In an embodiment, devices (such as the remote MAC device) that operate on the control plane can refer to devices that determine where data traffic is sent on the network. In another embodiment, the remote PHY device may refer to any suitable device that has a PHY layer functionality (that is, PHY layer functionality as described in connection with the open systems interconnection model, OSI model).

In another embodiment, diagram 400 shows first outputs 406 of the tap. In another embodiment, the first outputs 406 of the tap may represent the customer side (e.g., outputs to customer premise equipment). In one embodiment, the first outputs 406 of the tap may include a coaxial output of RF energy. In another embodiment, the first outputs 406 of the tap may be provided using any suitable connector type including, but not limited to, Bayonet Neill-Concelman (BNC) connectors, SubMiniature version A (SMA) connectors, SubMiniature version B (SMB) connectors, N-type connectors, SO-239 connectors, combinations thereof, and/or the like. In one embodiment, the first outputs 406 of the tap may feed out to a remote device (e.g., remote PHY device, remote MAC device) and/or a customer premise equipment (e.g., any terminal and associated equipment located at a subscriber's premises and connected with a carrier's telecommunication circuit; example non-limiting devices include telephones, routers, network switches, residential gateways (RG), set-top boxes, fixed mobile convergence products, home networking adapters and Internet access gateways, and/or the like). In an embodiment, diagram 400 shows second outputs 408 of tap. In various embodiments, the second outputs 408 of the tap may be similar to first outputs 406, described above.

In some embodiments, diagram 400 shows a first splitter 410 (e.g., a device that may serve to couple a defined amount of the electromagnetic power in a transmission line to a port enabling the signal to be used in another circuit). In another embodiment, the first splitter 410 may be referred to as power divider or directional coupler. In one embodiment, the first splitter 410 may include a passive element. In another embodiment, the first splitter 410 may only couple power in one direction (e.g., an input to output direction). In an embodiment, the first splitter 410 may have any suitable design, including, but not limited to, two coupled transmission lines (e.g., specialized cables or other structures designed to conduct alternating current of radio frequency, that is, currents with a predetermined frequency) set close enough together such that energy passing through one is coupled to the other. In some embodiments, the first splitter 410 may introduce an approximately 3.5 dB loss on the downstream (and another 3.5 dB loss on an upstream transmission using the splitter). In another embodiment, the loss of the first splitter 410 may include an insertion loss and/or a coupling loss. In particular, the insertion loss may include, but not be limited to, coupling loss, dielectric loss, conductor loss, and voltage standing wave ratio (VSWR) loss (e.g., VSWR may refer to a measure of impedance matching of loads to the characteristic impedance of a transmission line or waveguide), combinations thereof, and/or the like. In another embodiment, the coupling loss may refer to the loss that occurs when energy is transferred from one circuit, circuit element, or medium to another. In another embodiment, the losses may be frequency dependent.

In various embodiments, diagram 400 shows a second splitter 412. In particular, the second splitter may introduce another approximately 3.5 dB of loss. In some embodiments, the total loss in this example tap for a signal at first outputs 406 may be about 7 dB. In various embodiments, diagram 400 further shows a third splitter 414. In particular, the third splitter 414 may again, introduce another approximately 3.5 dB of loss. Accordingly, the total loss in this example tap for a signal at second outputs 408 may be about 11 dB. Further, the second splitter 412 and/or the third splitter 414 may be similar, but not necessarily identical to, the first splitter 410 described above.

In some embodiments, diagram 400 shows first lines 420. In particular, first lines 420 may serve to connect the first splitter 410 to the second splitter 412 and the third splitter 414. In another embodiment, the first lines 420 may include any suitable conductor, including a metal (e.g., copper, aluminum, silver, gold, combinations thereof, and/or the like). Further, the first lines 420 may include transmission lines of any suitable type (e.g., geometry and/or composition). In particular, the transmission lines may include any suitable construction and impedance matching, to carry electromagnetic signals with minimal reflections and power losses. In particular, the transmission lines may have a relatively uniform cross-sectional dimensions along their length, giving them a uniform impedance (e.g., a characteristic impedance) to prevent reflections. Non-limiting types of transmission line may include parallel line (ladder line, twisted pair), coaxial cable, and planar transmission lines such as stripline and microstrip transmission lines.

In various embodiments, diagram 400 shows second lines 422. In another embodiment, the second lines 422 may be similar to first line 420 but may serve to connect the second splitter 412 to the first outputs 406. In some embodiments, diagram 400 shows third lines 424. In particular, the third lines 424 may be similar to first line 420 but may serve to connect the third splitter 414 to the second outputs 408.

In various embodiments, while the example shown and described in connection with diagram 400 showed a tap including a four-way splitter having about 7 dB loss between input 404 and outputs (e.g., first outputs 406 and/or second outputs 408), higher order splitters can exist, and may have larger losses. For example, an 8-way splitter may have a loss of about 11 dB (e.g. by using three splitters). In some embodiments, taps may be designed to have a relatively wide operational bandwidth, high directivity, and be impedance matched at all ports when the other ports are terminated in matched loads.

FIG. 5 shows an example schematic diagram of a portion of a network using taps, in accordance with example embodiments of the disclosure. In particular, FIG. 5 shows a first diagram 501 of a portion of a network using taps, the taps having no amplifiers. In another embodiment, diagram 501 shows fiber 502 which may come from a headend device. In some embodiments, the fiber 502 may include an optical fiber (e.g., a flexible, transparent fiber made by drawing glass (silica) or plastic to a predetermined diameter; further, the optical fiber may include a core surrounded by a transparent cladding material with a lower index of refraction).

In various embodiments, diagram 501 shows a first remote device 504. In another embodiment, the first remote device 504 may include a remote PHY device and/or a remote MAC device. In some embodiments, the first remote device 504 may be deployed over a given geography (e.g., at a predetermined distance from the headend device). As previously noted, the remote devices may include remote MAC and/or remote PHY devices. In particular, the remote MAC devices, in combination with a switch at a headend device and (optionally) in combination with remote PHY devices, may perform aspects of a control plane functionality, a management plane functionality, and/or a data plane functionality. In an embodiment, the management plane functionality associated with a networking device can refer to configuring, monitoring, and providing management, monitoring and configuration services to, various devices operating at various layers of the network stack and other parts of the network. In an embodiment, the management plan functionality can be distinguished from the control plane functionality, in that the control plane functionality can be directed to implementing routing table and forwarding information activities. In an embodiment, devices (such as the remote MAC device) that operate on the control plane can refer to devices that determine where data traffic is sent on the network.

In various embodiments, the first remote device 504 may can serve as remote PHY device, that is, a device having PHY layer functionality (that is, PHY layer functionality as described in connection with the OSI model). In various embodiments, the PHY layer functionality may refer to the electronic circuit transmission technologies of a network and serve as a fundamental layer underlying the higher-level functions in the network. Further, the PHY layer may serve to define the means of transmitting raw bits rather than logical data packets over a physical data link connecting network nodes (e.g., various devices of the network). The bitstream may be grouped into code words or symbols and converted to a physical signal (e.g., a radio frequency (RF) signal, optical signal, combinations thereof, and/or the like) that is transmitted over a transmission medium (e.g., coaxial cable, fiber, combinations thereof, and/or the like).

In various embodiments, diagram 501 includes first taps 506. In some embodiments, the first taps 506 may be also referred to as terminations herein. In another embodiment, the first taps 506 may be spaced apart at a predetermined distance, for example, about 100 feet apart. In an embodiment, the first taps 506 may be bidirectional (e.g., capable of transmitting signals on the upstream or downstream directions). In another embodiment, the first taps 506 may incur losses (e.g., signal losses) as the first taps 506 are placed further from the first remote device 504 causing signals to propagate further from the first remote device 504 (e.g., 27 dB, 24 dB, 17 dB and 11 dB for first, second, third, and fourth taps of the first taps 506). In another embodiment, the first taps 506 may be connected to drop cables (also referred to as drops herein) to connect to customer premise equipment at households.

In various embodiments, diagram 501 includes a second remote device 508. In particular, the second remote device 508 may be similar to first remote device 504, as described above. In various embodiments, diagram 501 includes second taps 510. In some embodiments, the second taps 510 may be similar to first taps 506. In some embodiments, diagram 501 includes third taps 514. In particular, the third taps 514 may be similar to first taps 506.

In various embodiments, diagram 501 includes a bidirectional amplifier 512. In various embodiments, bidirectional amplifier 512 may refer to a type of electronic amplifier that converts a low-power RF signal into a higher power signal. As noted, the lines of a network can cause signals to undergo various impairments, for example, to the power spectral density of the signals on the network. In an embodiment, the impairment can be due to attenuation on the fibers and/or taps. In an embodiment, the impairments can lead to frequency distortions on the signals; for example, the higher frequency end of the signals may be attenuated. Accordingly, in an embodiment, bidirectional amplifier 512 can be used to perform a gain on the attenuated signals.

In another embodiment, the bidirectional amplifier 512 may operate in any suitable modes or classes, to help achieve different design goals. Non-limiting examples include class A, class B, class C and class E. In another embodiment, the bidirectional amplifier 512 may use solid-state devices such as bipolar junction transistors (BJTs) and metal-oxide-semiconductor field-effect transistor (MOSFET) devices. In another embodiment, the bidirectional amplifier 512 can also be referred to as an amp or booster. In some embodiments, the bidirectional amplifier 512 may need a power source; moreover, a coaxial cable may be used to deliver the electrical power (e.g., through the copper wire inside the cable). In another embodiment, the bidirectional amplifier 512 may be positioned suitably (e.g., in an area where the drop connects to the home) in order to optimize the signal-to-noise ratio (SNR) of the signal.

In various embodiments, FIG. 5 shows a second diagram 503. In one embodiment, the second diagram 503 may include a headend 524. The headend 524 may include CMTS, which can send and receives cable modem signals on a cable network, for example, to provide Internet services to cable subscribers. In another embodiment, the headend 524 may be configured to operate using any suitable protocol, such as a DOCSIS protocol. In some embodiments, the DOCSIS specification referenced herein may enable the deployment of data-over-cable systems on a nonproprietary, multi-vendor, interoperable basis for bidirectional transfer of Internet Protocol (IP) traffic between a cable system headend and customer equipment over an HFC cable network. In some aspects, the CMTS or access controller node can refer to a piece of equipment, for example, equipment located in a cable company's headend or hubsite, which can be used to provide data services, such as cable Internet or Voice over Internet Protocol (VoIP). In some aspects, the CMTS or access controller node can include aspects of the functionality of the management computing entity 100, described above.

In an embodiment, the second diagram 503 may include fiber 526. As noted, the fiber 502 may include an optical fiber (e.g., a flexible, transparent fiber made by drawing glass (silica) or plastic to a predetermined diameter; further, the optical fiber may include a core surrounded by a transparent cladding material with a lower index of refraction).

In another embodiment, the second diagram 503 may include a remote device 528. In another embodiment, the first remote device 528 may include a remote PHY device and/or a remote MAC device. In some embodiments, the first remote device 528 may be deployed over a given geography (e.g., at a predetermined distance from the headend device). As previously noted, the remote devices may include remote MAC and/or remote PHY devices. In particular, the remote MAC devices, in combination with a switch at a headend device and (optionally) in combination with remote PHY devices, may perform aspects of a control plane functionality, a management plane functionality, and/or a data plane functionality. In an embodiment, the management plane functionality associated with a networking device can refer to configuring, monitoring, and providing management, monitoring and configuration services to, various devices operating at various layers of the network stack and other parts of the network. In an embodiment, the management plan functionality can be distinguished from the control plane functionality, in that the control plane functionality can be directed to implementing routing table and forwarding information activities. In an embodiment, devices (such as the remote MAC device) that operate on the control plane can refer to devices that determine where data traffic is sent on the network.

In various embodiments, the first remote device 528 may can serve as remote PHY device, that is, a device having PHY layer functionality (that is, PHY layer functionality as described in connection with the OSI model). In various embodiments, the PHY layer functionality may refer to the electronic circuit transmission technologies of a network and serve as a fundamental layer underlying the higher-level functions in the network. Further, the PHY layer may serve to define the means of transmitting raw bits rather than logical data packets over a physical data link connecting network nodes (e.g., various devices of the network). The bitstream may be grouped into code words or symbols and converted to a physical signal (e.g., a radio frequency (RF) signal, optical signal, combinations thereof, and/or the like) that is transmitted over a transmission medium (e.g., coaxial cable, fiber, combinations thereof, and/or the like).

In one embodiment, the second diagram 503 may include taps 530. As noted, the taps 530 may include active taps, that is, taps having an amplifier (e.g., bidirectional amplifier) embedded within the tap. In various embodiments, bidirectional amplifier may include electronic amplifier that converts a low-power radio-frequency signal into a higher power signal. As noted, in an embodiment, bidirectional amplifier can be used to perform a gain on the attenuated signals. In another embodiment, the bidirectional amplifier may operate in any suitable modes or classes, to help achieve different design goals. Non-limiting examples include class A, class B, class C and class E. In another embodiment, the bidirectional amplifier may use solid-state devices such as BJTs and MOSFET devices. In some embodiments, the bidirectional amplifier may need a power source; moreover, a coaxial cable may be used to deliver the electrical power (e.g., through the copper wire inside the cable).

FIG. 6 shows an example schematic diagram of an active tap, in accordance with example embodiments of the disclosure. In particular, diagram 600 of FIG. 6 includes a schematic of the active tap. In another embodiment, diagram 600 shows housing 602. In an aspect, the housing 602 may be similar, but not necessarily identical to, housing 402 shown and described in connection with FIG. 4, above. In an embodiment, the housing 602 may be larger if needed to house additional components (as described below). Further, the housing 602 may require additional cooling to account for more active components (e.g., cable modem 612, controller 614, and/or bidirectional amplifier 620).

In some embodiments, diagram 600 shows input 604. In some embodiments, the input 604 to the tap may be from a cable and/or a plant side. In an embodiment, the input 604 to the tap may feed in from a remote device (e.g., remote PHY device, remote MAC device, and/or the like). In another embodiment, the input 604 to the tap may include a signal that is inputted to a coaxial input and having RF energy. In some embodiments, the input 404 to the tap may be provided using any suitable connector.

In various embodiments, diagram 600 shows first output 606. In another embodiment, the first output 606 may include a pass-through output. In another embodiment, a signal on the first output 606 may be approximately the same as the signal on the input 604. In one embodiment, the signal on the first output 606 may have been amplified by bidirectional amplifier 620, to be described further below.

In another embodiment, the first output 606 of the tap may represent the customer side (e.g., outputs to customer premise equipment). In one embodiment, the first output 606 of the tap may include a coaxial output of RF energy. In another embodiment, the first outputs 406 of the tap may be provided using any suitable connector type including, but not limited to, BNC connectors, SMA connectors, SMB connectors, N-type connectors, SO-239 connectors, combinations thereof, and/or the like. In one embodiment, the first output 606 of the tap may feed out to a remote device (e.g., remote PHY device, remote MAC device) and/or a customer premise equipment.

In various embodiments, diagram 600 shows second outputs 608. In particular, the second outputs 608 may be similar to output 406 of FIG. 4B and/or first output 606 of FIG. 6, described above. In another embodiment, the signal at second output 608 may be amplified by bidirectional amplifier 620, to be described further below.

In various embodiments, diagram 600 shows third outputs 610. In particular, the third outputs 610 may be similar to output 408 of FIG. 4B and/or first output 606 of FIG. 6, described above. Further, the signal at second output 610 may be amplified by bidirectional amplifier 620, to be described further below.

In various embodiments, diagram 600 shows a cable modem 612. In some embodiments, the cable modem 612 may be connected to input 604 via first directional coupler 616. In another embodiment, the cable modem 612 may be configured to communicate with other devices on network (e.g., remote devices, control devices, customer premise equipment devices, and/or the like). Further, the cable modem 612 may be configured to communicate using any suitable protocol (e.g., DOCSIS). In another embodiment, the cable modem 612 may serve to cause the controller 614 to open and close relays (not shown) associated with the second connection 638, third connection 640, and/or fourth connection 642, described below. In an embodiment, the cable modem 612 may include processor and memory. In particular, the memory may serve to store various measurements related to signal strength on the input 604.

In various embodiments, diagram 600 shows a controller 614. In some embodiments, the controller 614 may include processor and memory. In another embodiment, the controller 614 may be electronically coupled to cable modem 612. Further, the controller 614 may be configured to open and close relays associated with second connection 638, third connection 640, and/or fourth connection 642, described below. In another embodiment, the controller 614 may read signal strength related information from relays associated with the first lines 630, second lines 632, third lines 634, described below. In some embodiments, the controller 614 may control aspects of the bidirectional amplifier 621 (e.g., the degree of amplification for various frequency bands at a given time).

In various embodiments, diagram 600 shows a first directional coupler 616. In particular, the first directional coupler 616 may serve to send a portion of the signal on the input 604 to the cable modem 612. In another embodiment, the first directional coupler 616 may include a passive element. In another embodiment, the first directional coupler 616 may only couple power in one direction (e.g., from input to output). In one embodiment, the first directional coupler 616 may have any suitable design, including, but not limited to, two coupled transmission lines set close enough together such that energy passing through one is coupled to the other. In another embodiment, the first directional coupler 616 may be configured to have minimal insertion and/or coupling losses.

In various embodiments, diagram 600 shows a second directional coupler 618. In particular, the second directional coupler 618 may serve to input a portion of the signal after passing through the input 604 and the first directional coupler 618 to the first splitter 620. Further, the second directional coupler 618 may be similar, but not necessarily identical to, to first directional coupler 616.

In various embodiments, diagram 600 shows a bidirectional amplifier 621. In various embodiments, bidirectional amplifier 621 may include electronic amplifier that converts a low-power radio-frequency signal into a higher power signal. In another embodiment, the bidirectional amplifier 621 may include a device having dimensions that are configured to be positioned inside housing 602 of the active tap. As noted, in an embodiment, bidirectional amplifier 621 can be used to perform a gain on the attenuated signals. In another embodiment, the bidirectional amplifier 621 may operate in any suitable modes or classes, to help achieve different design goals. Non-limiting examples include class A, class B, class C and class E. In another embodiment, the bidirectional amplifier 621 may use solid-state devices such as BJTs and MOSFET devices. In some embodiments, the bidirectional amplifier may need a power source; moreover, a coaxial cable may be used to deliver the electrical power (e.g., through the copper wire inside the cable).

In various embodiments, diagram 600 shows a first splitter 620. In some embodiments, the first splitter 620 may be similar, but not necessarily identical to, first splitter 410 of FIG. 4, above. Moreover, the first splitter 620 may introduce an approximately 3.5 dB loss to the received portion of the signal. In one embodiment, the first splitter 620 may have the signal amplified via a connection (not shown) to the bidirectional amplifier 621, to be described further below.

In various embodiments, diagram 600 shows a second splitter 622. In some embodiments, the second splitter 622 may be similar, but not necessarily identical to, second splitter 412 of FIG. 4, above. Further, the second splitter 622 may have the signal amplified via a connection (not shown) to the bidirectional amplifier 621, to be described further below.

In various embodiments, diagram 600 shows a third splitter 624. In some embodiments, the third splitter 624 may be similar, but not necessarily identical to, second splitter 414 of FIG. 4, above. In another embodiment, the third splitter 624 may be configured to have the signal amplified via a connection (not shown) to the bidirectional amplifier 621, to be described further below.

In various embodiments, diagram 600 shows first lines 630. In some embodiments, the first lines 630 may include any suitable conductor, including a metal (e.g., copper, aluminum, silver, gold, combinations thereof, and/or the like). In another embodiment, the first lines 630 may serve to connect the first splitter 620 to the second splitter 622 and/or the third splitter 624. In various embodiments, diagram 600 shows second lines 632. In particular, the second lines 632 may be similar to first line 420 but may serve to connect the second splitter 622 to the second outputs 608. In various embodiments, diagram 600 shows third lines 634. In particular, the third lines 634 may be similar to first line 420 but may serve to connect the second splitter 624 to the third outputs 610.

In various embodiments, diagram 600 shows first connection 636. In some embodiments, the first connection 636 may serve to electronically couple the CM 612 to the controller 614. In various embodiments, diagram 600 shows second connection 638. In particular, the second connection 638 may serve to electronically couple the controller 614 to the third splitter 624. Further, the second connection 638 may allow the controller 614 to control a relay that may turn the third splitter 624 on and off. In various embodiments, diagram 600 shows third connection 640. In particular, the third connection 640 may serve to electronically couple the controller 614 to the first splitter 620. In further embodiments, the third connection 640 may allow the controller 614 to control a relay that may turn the first splitter 620 on and off. In various embodiments, diagram 600 shows fourth connection 642. In some embodiments, fourth connection 642 may serve to electronically couple the controller 614 to the second splitter 622. In further embodiments, the fourth connection 642 may allow the controller 614 to control a relay that may turn the second splitter 622 on and off. In various embodiments, there may be many additional connections and/or splitters. In particular, diagram 600 illustrates merely an example diagram.

FIG. 7 shows a schematic diagram of a cable modem, in accordance with example embodiments of the disclosure. In particular, diagram 701 shows a schematic of a cable modem. In various embodiments, diagram 701 shows an operating system 702. In an aspect, the operating system 702 may include any suitable operating system, such as a Linux or a Unix operating system.

In various embodiments, diagram 701 shows a protocol 704. In another embodiment, the protocol 704 may include any suitable standard. For example, the various embodiments of the disclosure may conform with a data over cable service interface specification (DOCSIS) specification, including, but not limited to, a DOCSIS comprises at least one of (i) a DOCSIS 1.0, (ii) a DOCSIS 2.0, (iii) a DOCSIS 3.0, (iv) a DOCSIS 3.1, or (v) a DOCSIS 3.1 full-duplex specification. As used herein, DOCSIS can refer to telecommunications specifications that facilitates the addition of high-bandwidth data transfer to a cable network system. In particular, the DOCSIS specification may enable the deployment of data-over-cable systems on a nonproprietary, multivendor, interoperable basis for bidirectional transfer of Internet Protocol (IP) traffic between a cable system headend and customer equipment over an all-coaxial or HFC network.

In various embodiments, diagram 701 shows memory 706, as described above. In particular, the memory 706 may serve to store measurement results. Further, the memory 706 may include pilot signals to detect and/or transmit.

In another embodiment, the cable modem may include processor(s) for communicating with controller (e.g., controller 614 of FIG. 6, above), communicating with other devices on network, performing signal modulation, combinations thereof, and/or the like. As noted above, the processor(s) may be embodied as one or more complex programmable logic devices (CPLDs), microprocessors, multi-core processors, coprocessing entities, application-specific instruction-set processors (ASIPs), microcontrollers, and/or controllers. Further, the processor(s) may be embodied as one or more other processing devices or circuitry. The processor(s) may be embodied as integrated circuits, application specific integrated circuits (ASICs), field programmable gate arrays (FPGAs), programmable logic arrays (PLAs), hardware accelerators, other circuitry, and/or the like.

In various embodiments, the cable modem may be configured to communicate with the controller (e.g., controller 614 as shown and described in connection with FIG. 6, above) using any suitable standard, including, but not limited to, a peripheral component interconnect express) (PCI Express) standard, which may refer to a high-speed serial computer expansion bus standard. May further include PCI, PCI-X and Accelerated Graphics Port (AGP) bus standards, or any other suitable standard.

In various aspects, as noted, the components described in connection with diagram 600 may include aspects of the functionality of the management computing entity 100, as shown and described in connection with FIGS. 1-2, above. In particular, the processing component, the transmitting component, and/or the receiving component may be configured to be in communication with one or more processing elements 205, memory 210, volatile memory 215, and may include a communication interface 220 (e.g., to facilitate communication between devices, for example, with various customer premise equipment such as cable modems).

Moreover, the components described in connection with diagram 600 may be further configured to transmit data packets to customer premise equipment, which may include devices that include aspects of the functionality of the user device 110, as further shown and described in connection with FIG. 3, above. For example, customer premise equipment may include a device having a transmitter 308, a receiver 304, and/or a network interface (e.g., to communicate with an access point or other device to receive information from the fiber node 410 or similar device). Moreover, the customer premise equipment may include a device having volatile memory 322 and/or non-volatile memory 324 in addition to a processor (e.g., to perform one or more computational tasks, such as processing received signals, etc.). Further, the customer premise equipment may include a display 316 and/or a keypad 318 (e.g., for interacting with a user or operator).

FIG. 8 shows a flow chart illustrating example operations that may be performed by one or more devices described in connection with the disclosed system, in accordance with various embodiments of the disclosure. At block 802, the flow may include providing an input port of a device to receive a first RF signal. In some embodiments, the input to the tap may be from a cable and/or a plant side. In an embodiment, the input to the tap may feed in from a remote device (e.g., remote PHY device, remote MAC device, and/or the like). In another embodiment, the input 404 to the tap may include a signal that is inputted to a coaxial input and having radio frequency (RF) energy. In some embodiments, the input to the tap may be provided using any suitable connector.

At block 804, the flow may include providing a plurality of output ports of the device to transmit second RF signals based on the first RF signal. In another embodiment, the first outputs of the tap may represent the customer side (e.g., outputs to customer premise equipment). In one embodiment, the first outputs of the tap may include a coaxial output of RF energy. In another embodiment, the first outputs of the tap may be provided using any suitable connector type including, but not limited to, BNC connectors, SMA connectors, SMB connectors, N-type connectors, SO-239 connectors, combinations thereof, and/or the like. In one embodiment, the first outputs of the tap may feed out to a remote device (e.g., remote PHY device, remote MAC device) and/or a customer premise equipment (e.g., any terminal and associated equipment located at a subscriber's premises and connected with a carrier's telecommunication circuit; example non-limiting devices include telephones, routers, network switches, residential gateways, set-top boxes, fixed mobile convergence products, home networking adapters and Internet access gateways, and/or the like).

At block 806, the flow may include coupling a bidirectional amplifier to the input port and at least a portion of the plurality of output ports. In various embodiments, bidirectional amplifier may refer to a type of electronic amplifier that converts a low-power radio-frequency signal into a higher power signal. As noted, the lines of a network can cause signals to undergo various impairments, for example, to the power spectral density of the signals on the network. In an embodiment, the impairment can be due to attenuation on the fibers and/or taps. In an embodiment, the impairments can lead to frequency distortions on the signals; for example, the higher frequency end of the signals may be attenuated. Accordingly, in an embodiment, bidirectional amplifier can be used to perform a gain on the attenuated signals.

At block 808, the flow may include modifying, using the bidirectional amplifier, the magnitude of at least the first RF signal. In another embodiment, the bidirectional amplifier may operate in any suitable modes or classes, to help achieve different design goals. Non-limiting examples include class A, class B, class C and class E. In another embodiment, the bidirectional amplifier 512 may use solid-state devices such as BJTs and MOSFET devices. In some embodiments, the bidirectional amplifier may need a power source; moreover, a coaxial cable may be used to deliver the electrical power (e.g., through the copper wire inside the cable). In another embodiment, the bidirectional amplifier may be positioned suitably (e.g., in an area where the drop connects to the home) in order to optimize the SNR of the signal.

In various embodiments, a controller may be coupled to the cable modem and controlling, via the controller. Moreover, based on instructions from the cable modem, the bidirectional amplifier may operate relays associated with the plurality of output ports. In another embodiment, it may be determined that signal strength measurements are greater than a first threshold, and the controller may be configured to turn off at least one relay of the relays. In some embodiments, the device may be configured to operate on a frequency band from between approximately 0 MHz to approximately 3 GHz. In various embodiments, to modulate the RF signals using NOMA technique.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an implementation of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying FIGS. do not necessarily require the particular order shown, or sequential order, to achieve desirable results. In certain implementations, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A device, comprising:
an input port for receiving a first radio frequency (RF) signal;
a plurality of output ports for transmitting second RF signals based on the first RF signal, the plurality of output ports associated with customer premise equipment;
a bidirectional amplifier electrically coupled to the input port and the plurality of output ports;
a first splitter electrically coupled to the bidirectional amplifier and a first output port of the plurality of output ports;
a second splitter electrically coupled to the bidirectional amplifier and a second output port of the plurality of output ports; and
a controller configured to activate the second splitter by sending a first instruction to the second splitter and to deactivate the first splitter by sending a second instruction to the first splitter while the second splitter is active, wherein the bidirectional amplifier is configured to modify a magnitude of at least the first RF signal.

2. The device of claim 1, further comprising a cable modem including at least one memory that stores computer-executable instructions; and at least one processor configured to access the at least one memory, wherein the at least one processor is configured to execute the computer-executable instructions to:
determine one or more signal strength measurements associated with the first RF signal or the second RF signals; and
store the one or more signal strength measurements in the at least one memory.

3. The device of claim 2, wherein the controller is communicatively coupled to the cable modem and is further configured to control, based on instructions from the cable modem, the bidirectional amplifier or operate, based on instructions from the cable modem, relays associated with the plurality of output ports.

4. The device of claim 3, wherein when the one or more signal strength measurements are greater than a first threshold, the controller deactivates at least one relay of the relays.

5. The device of claim 1, wherein the device is configured to operate on a frequency band from between approximately 0 MHz to approximately 3 GHz.

6. The device of claim 1, wherein the bidirectional amplifier comprises at least one of a pushpin attenuator, a potentiometer, or a variable attenuator.

7. A system comprising:
an input port for receiving a first radio frequency (RF) signal;
a plurality of output ports for transmitting second RF signals based on the first RF signal, the plurality of output ports associated with customer premise equipment; and
a bidirectional amplifier electrically coupled to the input port and at least a portion of the plurality of output ports, wherein the bidirectional amplifier is configured to modify a magnitude of at least the first RF signal;
a first splitter electrically coupled to the bidirectional amplifier and a first output port of the plurality of output ports;
a second splitter electrically coupled to the bidirectional amplifier and a second output port of the plurality of output ports; and
a controller configured to activate the second splitter by sending a first instruction to the second splitter and to deactivate the first splitter by sending a second instruction to the first splitter while the second splitter is active.

8. The system of claim 7, wherein the second RF signals are transmitted over a hybrid fiber-coaxial (HFC) network.

9. The system of claim 7, further comprising:
a cable modem including at least one memory that stores computer-executable instructions; and
at least one processor configured to access the at least one memory, wherein the at least one processor is configured to execute the computer-executable instructions to:
determine one or more signal strength measurements associated with the first RF signal or the second RF signals; and
store the one or more signal strength measurements in the at least one memory.

10. The system of claim 9, wherein the controller is communicatively coupled to the cable modem and is further configured to control, based on instructions from the cable modem, the bidirectional amplifier or operate, based on instructions from the cable modem, relays associated with the plurality of output ports.

11. The system of claim 10, wherein when the one or more signal strength measurements are greater than a first threshold, the controller deactivates at least one relay of the relays.

12. The system of claim 7, wherein the system is configured to operate on a frequency band from between approximately 0 MHz to approximately 3 GHz.

13. The system of claim 7, wherein the bidirectional amplifier comprises at least one of a pushpin attenuator, a potentiometer, or a variable attenuator.

14. The system of claim 7, wherein the first RF signal comprises an RF signal that is modulated using non-orthogonal multiple access (NOMA) technique.

15. A method, comprising:
receiving, by an input port of a device, a first radio frequency (RF) signal;
transmitting, by a plurality of output ports of the device, second RF signals and third RF signals, the second RF signals and the third RF signals based on the first RF signal, and the plurality of output ports associated with customer premise equipment;
amplifying, by a bidirectional amplifier electronically coupled to the input port and at least a portion of the plurality of output ports, a magnitude of the second RF signals;
splitting, by a first splitter electrically coupled to the bidirectional amplifier and a first output port of the plurality of output ports, the first RF signal into the second RF signals;
splitting, by a second splitter electrically coupled to the bidirectional amplifier and a second output port of the plurality of output ports, the first RF signal into the third RF signals;
activating the second splitter, using a controller, by sending a first instruction to the second splitter; and
deactivating the first splitter, using a controller, by sending a second instruction to the first splitter while the second splitter is active.

16. The method of claim 15, further comprising:
determining, by a cable modem, one or more signal strength measurements associated with the first RF signal or the second RF signals; and
storing the one or more signal strength measurements in at least one memory.

17. The method of claim 16, further comprising controlling, via the controller, and based on instructions from the cable modem, the bidirectional amplifier or operating operate, based on instructions received from the cable modem, relays associated with the plurality of output ports.

18. The method of claim 17, further comprising determining that the signal strength measurements are greater than a first threshold, and deactivating, by the controller, at least one relay of the relays.

19. The method of claim 16, wherein the device is configured to operate on a frequency band from between approximately 0 MHz to approximately 3 GHz.

20. The method of claim 16, further comprising modulating the first RF signal using a non-orthogonal multiple access (NOMA) technique.

* * * * *